United States Patent Office 3,781,340
Patented Dec. 25, 1973

3,781,340
ALKYL PHTHALIC ACID COMPOUNDS
Stephen E. McGuire, Ponca City, Okla., assignor to
Continental Oil Company, Ponca City, Okla.
No Drawing. Filed Sept. 29, 1969, Ser. No. 862,035
Int. Cl. C07c 63/16, 63/20, 63/24
U.S. Cl. 260—515 P
4 Claims

ABSTRACT OF THE DISCLOSURE

Novel surface active agents are provided having the general formula:

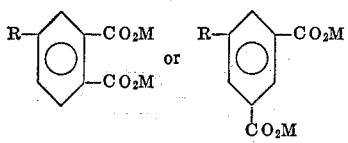

wherein R is a tertiary alkyl group containing from about 8 to about 16 carbon atoms and M is a cation selected from the group consisting of Li, Na, K, Rb, Cs, Ca, Mg, $NH_4$ and substituted ammonium.

BACKGROUND OF THE INVENTION

Field of the invention

This invention relates to surface active agents. In one aspect this invention relates to the novel surface agents containing two functional groups per molecule.

Brief description of the prior art

Surface active agents, better known as surfactants, are generally employed to manipulate the surface tension or interfacial tension of a liquid. Many types of surfactants are available on the market and their properties are well known. In addition, the uses for surface active agents are broad and varied and include application in detergents, textile processing, as emulsifiers, and as solubilizers. Thus, new surfactants are constantly being sought within the industry to overcome deficiencies prevalent in many of the prior art surfactants.

OBJECTS OF THE INVENTION

An object of the invention is to provide a novel surface active agent. Another object of the invention is to provide a novel surface active agent containing two functional groups per molecule. These and other objects, advantages, and features of the present invention will become apparent to those skilled in the art from a reading of the following detailed disclosure and appended claims.

SUMMARY OF THE INVENTION

According to the present invention novel surface active agents are provided having the general formula:

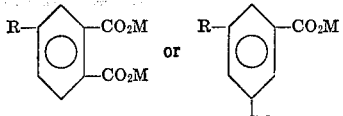

wherein R is a tertiary alkyl group containing from about 8 to 16 carbon atoms and M is a cation selected from the group consisting of Li, Na, K, Rb, Cs, Ca, Mg, $NH_4$ and substituted ammonium.

DESCRIPTION OF PREFERRED EMBODIMENTS

The novel surface active agents of the present invention are those having the general formula:

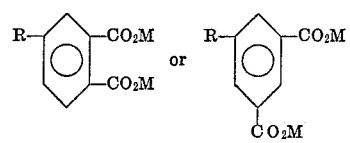

wherein R is a tertiary alkyl group

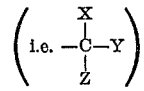

containing from about 8 to about 16 carbon atoms and M is a cation selected from the group consisting of Li, Na, K, Rb, Cs, Ca, Mg, $NH_4$ and substituted ammonium. Suitable substituted ammonium cations are alkyl ammonium, such as methyl ammonium, dimethyl ammonium, and the like; and alkanol ammonium, such as monoethanol, diethanol, triethanol ammonium and the like.

The term "surface active agent," as used in this specification, is a compound which lowers the surface tension of water. It is well known that such surface active agents are employed in detergent formulations and are used as wetting agents to improve the wettability of substances. As previously stated, the R in the formula described above of the surface active agents of the present invention is a tertiary acyclic alkyl moiety and thus neither $x$, $y$, nor $z$ can be a hydrogen atom. The term "acyclic," as used in this specification is to include both linear and branched alkyl groups. When it is desirable to produce a surface active agent having a high degree of biodegradabilty $x$, $y$, and $z$ of R defined above must be linear alkyl groups such as methyl, ethyl, n-propyl, n-butyl, n-pentyl, n-hexyl, n-heptyl and the like. Likewise, the only requirement as to the linear alkyl groups $x$, $y$, and $z$ in order to obtain good surfactant property is that the sum of the total number of carbon atoms in R is within the range of from about 8 to 16 carbon atoms.

When biodegradability is not a criteria which the novel surface active agents of the present invention must meet, R can be a tertiary branched alkyl group such as that derived from the petroleum fraction commonly known as cat-poly dodecene or propylene tetramer or any other suitable branched olefin. Examples of other such compounds are 2,4,4-trimethylpentene-1; 2,4,4-trimethylpentene-2; and other such isooctenes; 2,6-dimethyl-heptene-3; 2,8-dimethyltetradecene-2; and hydrogen halide derivatives of same. However, as was the case in producing the biodegradable surface active agents described above under no circumstances can $x$, $y$, or $z$ be hydrogen. As previously stated in producing the surface active agents of the present invention the R in the structural formula defined above must be a tertiary acyclic alkyl group to prevent oxidation of said group.

For example, when a primary substituent or a secondary substituent is used as R then the primary and secondary substituents are readily oxidized. However, when a tertiary substituent is employed as R the radical is inert to the same type of oxidation. Thus, one can readily see that an arene containing both a primary and a tertiary substituent as represented in the general formula

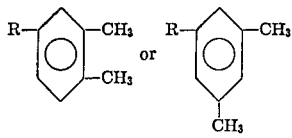

wherein R is as defined above that the primary substituent can be selectively oxidized without oxidation of the tertiary component. The method of selective oxidation of the primary substituent can be by any suitable method which is well known in the art. However, the above clearly indicates that one must carefully choose the reactants and the process in order to produce a compound meeting the above requirement. Desirable results have been obtained where the surface active agents of the present invention are prepared by alkylating o-xylene with the appropriate alkyl chloride or olefin in the presence of a nitromethane-moderated aluminum chloride catalyst. By conducting such a reaction, one is insured of a tertiary alkylation reaction. The arene thus obtained can be selectively oxidized by any suitable means, such as a cobalt acetate-sodium bromide catalyst in glacial acetic acid. The resulting acid can then be neutralized by any suitable alkali to produce a molecule containing the desired cation constituents. The amount of neutralizing agent and the reaction conditions will vary depending upon the particular neutralizing agents being employed. However, especially desirable results have been obtained wherein sodium hydroxide has been employed as the neutralizing agent.

In order to more fully describe the surface active agents of the present invention, the following specific examples in the preparation and utilization of novel surface active agents of the present invention are provided. However, it is to be understood that the following examples are for illustrative purposes only and that the limitations contained therein are not to be construed as unduly limiting the scope of the invention which will be defined in the claims hereinafter.

EXAMPLE I

An experiment was conducted to prepare 6-chloro-6-methylundecane. n-Amyl magnesium bromide was prepared from 2.00 moles of n-amyl bromide and 2.20 moles of magnesium in 2 liters of anhydrous ether. To this Grignard reagent was added 1.75 moles of 2-heptanone dissolved in 200 ml. of anhydrous ether. The resultant product was hydrolyzed by the addition of a solution of 200 ml. of concentrated hydrochloric acid in 1300 ml. of water. The organic phase was isolated, washed with saturated sodium bicarbonate and water, and dried over sodium sulfate. The product was distilled through a six-inch Vigreux column yielding 247 g. of liquid boiling 80–90° C. (1.0–2.0 mm. Hg). This was identified by IR and NMR as the desired methyl-di-n-amyl carbinol.

This alcohol was converted to 6-chloro-6-methylundecane as follows. Two hundred and forty-five grams were stirred in a flask at 0 to −10° C. while dry hydrogen chloride gas was bubbled in over a 2-hour period. The liquid was then purged with nitrogen gas and placed in a desiccator containing sodium hydroxide overnight to remove residual hydrogen chloride. The next morning a 20 ml. water layer was drawn off. The organic phase was washed two times with cold 5% sodium carbonate and dried. The remaining uncharged alcohol was removed by two extractions with 15 ml. portions of concentrated sulfuric acid. The product was again washed and dried. Simple vacuum distillation afforded 108 g. of liquid boiling 54–70° C. (0.25–0.60 mm. Hg). This was identified by IR and NMR to be the desired 6-chloro-6-methylundecane.

EXAMPLE II

An experiment was conducted to prepare 1,2-dimethyl-4-(1-methyl-1-pentylhexyl) benzene. One mole of o-xylene was placed in a flask fitted with a magnetic stirrer, a thermometer, a dropping funnel and a condenser having a drying tube. A premixed aluminum chloride-nitromethane complex was then added to the o-xylene. The premixed complex was formed by admixing 0.025 mole of aluminum chloride and 0.25 mole of nitromethane. After the addition of the aluminum chloride-nitromethane complex the resulting mixture was maintained at a temperature of 25° and continuously stirred while 0.25 mole of 6-chloro-6-methylundecane was added to the mixture over a period of about 1¾ hrs. At the end of this period the reaction mixture was stirred for an additional 45 minutes and then hydrolyzed with ice water. The hydrolyzed mixture was washed, dried, and then vacuum distilled to yield 55.5 g. of a compound identified by GLC, IR and NMR as 1,2-dimethyl-4-(1-methyl-1-pentylhexyl) benzene.

25.0 grams of the 1,2-dimethyl-4-(1-methyl-1-pentylhexyl) benzene, 500 ml. of glacial acetic acid, 5.0 g. of cobalt acetate and 2.5 g. of sodium bromide were then introduced to the reaction vessel which consisted of a sintered glass inlet bubbler in the bottom of the flask. The flask was further fitted with a mechanical stirrer, a heating mantle, a condenser and a thermometer. Oxygen was then bubbled into the reaction mixture at a rate of about 0.5 liter per minute and the reaction mixture was heated with stirring to a temperature of about 95 to about 100° C. for a period of about 3 hours. At the end of the three hour period, the reaction mixture was cooled to room temperature and the acetic acid solvent removed with a rotary evaporator at water aspirator pressure. Water was then added and the resultant thick oil layer extracted with ether. The ether extraction portion was then washed with water and dried over $Na_2SO_4$ followed by evaporation of the ether. The resulting product was then analyzed by GLC, IR and NMR and determined to be 4-(1-methyl-1-pentylhexyl) phthalic acid.

The acid so produced was then dissolved in a 50% solution of isopropyl alcohol at about 55° C. The pH of the solution was then adjusted to 11.3 by addition of a 50% sodium hydroxide solution. The solvent was then evaporated and the pasty solid dried in a vacuum oven. After drying the solvent was ground up to a light-brown powder. The powder was then analyzed by NMR and determined to be 4-(1-methyl-1-pentylhexyl) phthalic acid disodium salt.

EXAMPLE III

A run was conducted to prepare 1,2-dimethyl-4-(1-methyl-1-butylheptyl) benzene. In this experiment the procedure differs from that disclosed in Example II above only in the preparation of the alkyl-o-xylene. The oxidation procedure is similar to that described above. Thus, only the preparation of the alkyl-o-xylene will be discussed in detail. 0.95 mole of o-xylene and a premixed aluminum chloride complex containing 0.024 mole of aluminum chloride and 0.24 mole of nitromethane were placed in a flask fitted with a magnetic stirrer, a thermometer, a dropping funnel and a condenser equipped with a drying tube.

The resulting mixture was maintained at a temperature of about 25° C. as 2-butyloctene-1 was added dropwise to the mixture over a period of about four hours. After the 2-butyloctene-1 addition had been completed the mixture was stirred for an additional two hours and then hydrolyzed and worked up in the manner set forth in Example II above. Vacuum distillation of the resulting product gave 55.8 g. (85% yield) of a colorless liquid which, upon analysis by GLC, IR, and NMR was identified as 1,2-dimethyl-4-(1-methyl-1-butylheptyl) benzene.

The resulting product was then oxidized and neutralized by the same procedure as outlined in Example II above and determined to be 4-(1-methyl-1-butylheptyl) phthalic acid disodium salt.

EXAMPLE IV

In order to demonstrate the surface active properties of the novel surface active agents prepared in Examples II and III, a series of experiments were conducted to determine the effect of such surface active agents on the surface tension of water. The surface tension lowering of water by material added in small amounts is a measure of its ability to function as a surface active agent. In fact, as previously stated, the definition of a surface active agent is any material capable of lowering the surface tension of water. In these experiments the surface tensions of 0.01%, 0.5%, 0.1% weight percent solutions of the compounds produced in Examples II and III, hereinafter referred to as Compounds A and B, respectively, were measured. Results of such measurements are as follows:

TABLE I

| Sample number: | Structural | Compound | Surface tension, dynes/cm. | | |
|---|---|---|---|---|---|
| | | | 0.01% | 0.05% | 0.1% |
| 1 |  | A | 51.8 | 43.1 | 37.6 |
| 2 | 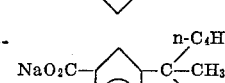 | B | 56.0 | 41.2 | 36.2 |
| 3 | 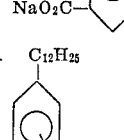 | Sodium salt of dodecylbenzene sulfonate. | 39.6 | 36.9 | 36.3 |

The data above clearly indicate that the compounds Compound A, and Compound B, of Examples II and III are surface active agents. Thus, it is clearly evident that especially desirable results can be obtained where the surface active agent is a dodecylphthalic acid disodium salt.

Having thus described the invention, I claim:

1. A surface active agent having the general formula:

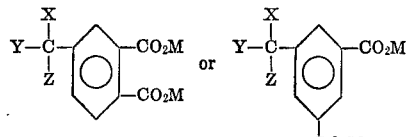

wherein X, Y and Z are alkyl groups containing from 1 to 13 carbon atoms, the total of X, Y and Z is from 7 to 15 carbon atoms and M is a cation selected from the group consisting of Li, Na, K, Rb, Cs, Ca, Mg, $NH_4$ methyl ammonium, dimethyl ammonium, monoethanolammonium, diethanolammonium and triethanol ammonium.

2. The surface active agent of claim 1 wherein said M is Na.

3. The surface active agent of claim 1 wherein said surface active agent is 4-(1-methyl-1-pentylhexyl) phthalic acid disodium salt.

4. The surface active agent of claim 1 wherein said surface active agent is 4-(1-methyl-1-butylheptyl)phthalic acid disodium salt.

References Cited

UNITED STATES PATENTS 3,361,793   2/1968   Wakeman et al. _____ 260—501

OTHER REFERENCES

Armitage et al.: Chem. Abstracts, vol. 60 (1964), pp. 14397–9.

U.N.C.: Chem. Abstracts, vol. 66 (1967), p. 76879b.

Du Pont: Chem. Abstracts, vol. 68 (1968), p. 40457q.

JAMES A. PATTEN, Primary Examiner

U.S. Cl. X.R.

252—356; 260—671 B

PO-1050
(5/69)

UNITED STATES PATENT OFFICE
CERTIFICATE OF CORRECTION

Patent No. 3,781,340   Dated December 25, 1973

Inventor(s)   Stephen E. McGuire

It is certified that error appears in the above-identified patent and that said Letters Patent are hereby corrected as shown below:

In Column 5, in Table I, under Sample number 2, $n\text{-}C_4H_{13}$ should read -- $n\text{-}C_4H_9$ -- .

Signed and sealed this 24th day of September 1974.

(SEAL)
Attest:

McCOY M. GIBSON JR.
Attesting Officer

C. MARSHALL DANN
Commissioner of Patents